(12) United States Patent
Vergani et al.

(10) Patent No.: US 10,892,692 B2
(45) Date of Patent: Jan. 12, 2021

(54) BACK ELECTROMOTIVE FORCE CONTROLLERS

(71) Applicant: HEWLETT-PACKARD DEVELOPMENT COMPANY, L.P., Houston, TX (US)

(72) Inventors: Michele Vergani, Sant Cugat del Valles (ES); Juan Manuel Zamorano, Sant Cugat del Valles (ES); Luis Ortega, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 322 days.

(21) Appl. No.: 16/089,655

(22) PCT Filed: Jul. 25, 2017

(86) PCT No.: PCT/US2017/043631
§ 371 (c)(1),
(2) Date: Sep. 28, 2018

(87) PCT Pub. No.: WO2019/022711
PCT Pub. Date: Jan. 31, 2019

(65) Prior Publication Data
US 2020/0313579 A1   Oct. 1, 2020

(51) Int. Cl.
*H02P 3/12*   (2006.01)
*H02P 7/00*   (2016.01)
(Continued)

(52) U.S. Cl.
CPC .............. *H02P 3/12* (2013.01); *B29C 64/393* (2017.08); *B33Y 50/02* (2014.12); *H02P 7/04* (2016.02)

(58) Field of Classification Search
None
See application file for complete search history.

(56) References Cited

U.S. PATENT DOCUMENTS 3,731,149 A * 5/1973 Sherman .................. H02H 7/08
                                                    361/4
4,143,307 A * 3/1979 Hansen .................. G08C 19/22
                                                    244/190
(Continued)

FOREIGN PATENT DOCUMENTS

JP       2005169634 A      6/2005
JP       2010081733 A      4/2010
(Continued)

OTHER PUBLICATIONS

"Back EMF", 3D Printers, Retrieved from Internet: http://zebethyalprusa.blogspot.in/2015/01/back-emf.html, Jan. 25, 2015, 6 pages.
(Continued)

*Primary Examiner* — Bentsu Ro
(74) *Attorney, Agent, or Firm* — HP Inc. Patent Department (57) ABSTRACT

Examples relate to back electromotive force controllers for influencing movement of a carriage of a device in an unpowered state; the carriage being moveable by a motor responsive to a motor driver; the controller comprising: braking circuitry to couple power associated with a back electromotive force generated by displacement of the motor, due to carriage movement, to power the motor driver to urge the motor in a contrary direction to the displacement.

15 Claims, 5 Drawing Sheets

(51) Int. Cl.
*B33Y 50/02* (2015.01)
*H02P 7/03* (2016.01)
*B29C 64/393* (2017.01)

(56) References Cited

U.S. PATENT DOCUMENTS

| | | | |
|---|---|---|---|
| 4,691,150 A | | 9/1987 | Jen |
| 4,833,386 A | * | 5/1989 | Unsworth ................ H02P 3/18 318/729 |
| 5,099,383 A | | 3/1992 | Fukano et al. |
| 5,847,522 A | * | 12/1998 | Barba .................... F16D 55/02 318/269 |
| 6,177,772 B1 | * | 1/2001 | Barua .................... G11B 19/20 318/362 |
| 6,937,429 B2 | | 8/2005 | Yoshida et al. |
| 9,469,102 B2 | | 10/2016 | Kurashina |
| 2005/0052145 A1 | * | 3/2005 | Carrier .................... H02P 3/12 318/381 |

FOREIGN PATENT DOCUMENTS

| | | |
|---|---|---|
| WO | 2007043828 A1 | 4/2007 |
| WO | 2015116161 A1 | 8/2015 |

OTHER PUBLICATIONS

"CTC Printer Back EMF", CTC Ltd, 3D Hubs Talk, Retrieved from Internet: https://www.3dhubs.com/talk/thread/ctc-printer-back-emf, 2017, 6 pages.

* cited by examiner

BACK ELECTROMOTIVE FORCE CONTROLLERS

BACKGROUND

Printers can provide a harsh operating environment with the consequence that regular maintenance may be beneficial. Even in an unpowered state, maintaining a printer or scanner can give rise to danger. For example, manually moving the carriages bearing the print heads can give rise to large voltages, that is, back electromotive forces (BEMF), which can present a danger to maintenance personnel charged with maintaining the printer.

BRIEF INTRODUCTION OF THE DRAWINGS

Examples implementations are described below with reference to the accompanying drawings, in which.

DETAILED DESCRIPTION

Figure 1:
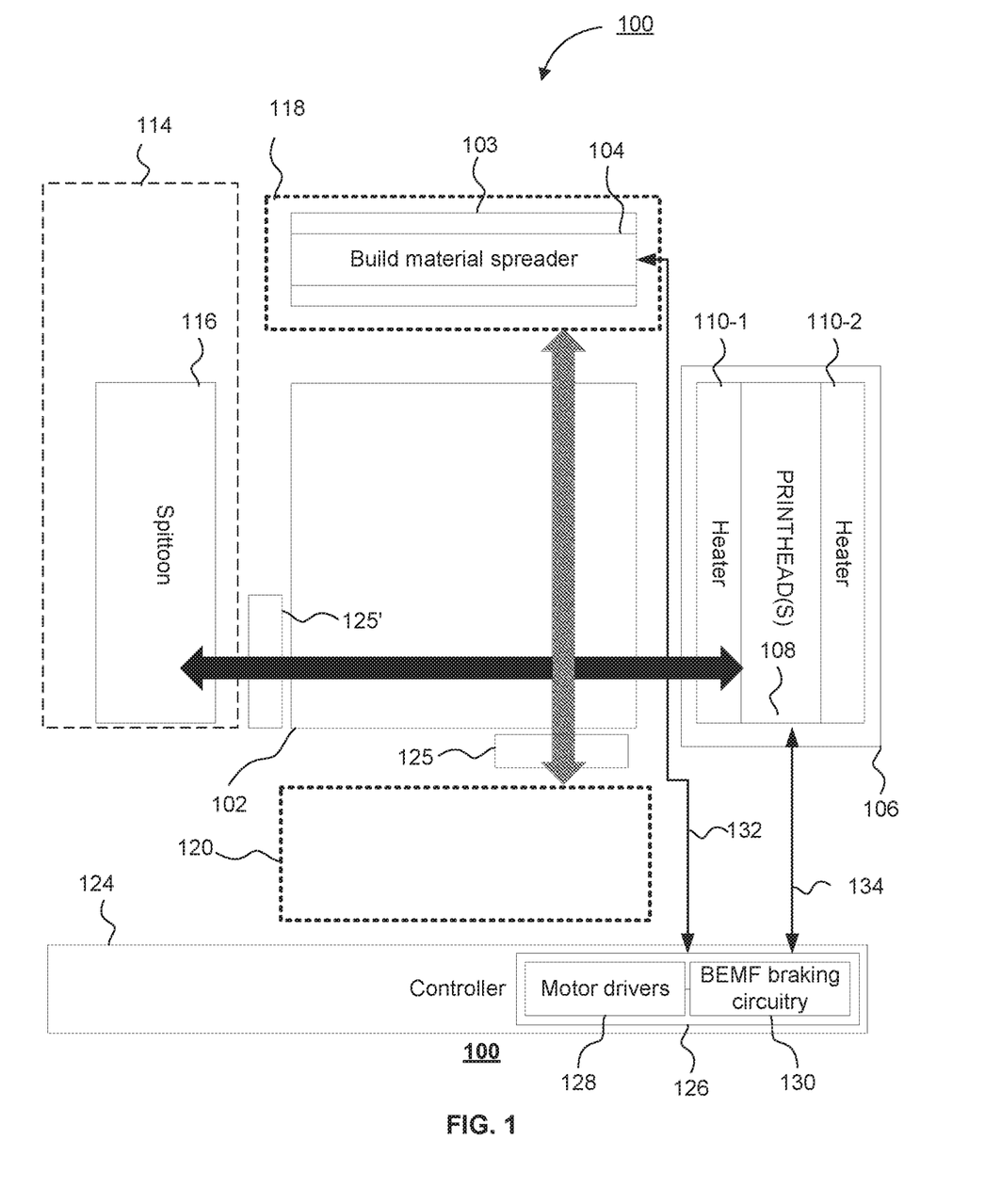
FIG. 1 shows a schematic diagram of a 3D printer according to some examples.

FIG. 1 schematically illustrates a plan view of a 3D printer 100. The 3D printer 100 comprises: a working area 102 in which a three-dimensional object can be generated. Example implementations can be realised in which the working area 102 forms part of a removable build unit that can be inserted into and removed from the printer 100. Alternatively, example implementations can be realised in which the working area 102 is an integral part of the printer 100 as opposed to being part of a removable build unit. The printer 100 further comprises a build material carriage 103 bearing a build material spreader 104. The build material spreader 104 creates a layer of build material, which can be in the form of a powder, from which an object can be incrementally built. Examples can be realised in which the build material spreader 104 spreads build material over the working area 102 to form such a layer. A printhead carriage 106 is also provided. The printhead carriage 106 comprises printheads 108 for printing at least one printing liquid. The printheads 108 can be arranged to deposit respective printing liquids on associated layers of build material. For example, the printing liquids can comprise at least one or more of a fusing agent, a detailing agent, one or more coloured inks, a transparent agent, or a printing agent comprising a dopant taken jointly and severally in any and all permutations.

The printhead carriage 106 can also be provided with one or more heaters 110 for heating and fusing the build material.

The printhead carriage 106, in this example, is arranged to traverse the working area 102 in a reciprocating manner. While traversing the working area 102, the printheads 108 can print printing liquids onto a layer of build material formed by the build material spreader 104.

The build material carriage 103 is arranged, in this example, to traverse the working area in a reciprocating manner. Build material can be laid or otherwise deposited via the build material spreader 104 during any or all such traversals. In the example shown, the build material carriage 103 is moveable between two end positions 118 and 120.

Producing a 3D object comprises the build material spreader 104 laying down a layer of build material in the working area 102 by passing between the end positions 118 and 120. After depositing a layer of the build material, the printhead carriage 106 traverses the working area selectively depositing printing fluids such as, for example, a fusing agent in areas or positions where particles of the build material are intended to be fused together. A detailing agent may also be selectively applied where the fusing action is to be reduced or amplified.

The process of depositing build material, depositing one or more than one printing fluid and heating the printed build material can be repeated in successive layers until a complete 3D object has been generated. This process can operate using multiple printhead jets/nozzles to apply, simultaneously in some implementations, the fusing and detailing agents to the build material. The term printed build material refers to build material coated with a printing fluid.

The environment within which the printheads 108 operate is harsh in that the operating temperatures, for example, can adversely affect the printing liquids within the printheads 108 or within conduits (not shown) leading to the printheads 108, especially in off axis printheads. Therefore, the above mentioned maintenance operations can be effected to counter any such adverse reactions of the printing liquids. Suitably, the printhead carriage 106 can be moved to the maintenance area 114 for maintenance operations. Within the maintenance area 114, the one or more than one printhead 108 can be operating to eject or otherwise expel a respective printing liquid onto the spittoon 116, The operations performed by the 3D printer 100 can be controlled via a controller 124. The controller 124 can comprise one or more processors, or other circuitry, for executing instructions for controlling the 3D printer 100. Therefore, the controller 124 can control at least one or more of moving the printhead carriage 106, printing print liquid from the printheads 108, moving the build material carriage 103, depositing build material from the build material spreader 104, maintenance operations, printing operations, heating operations etc. taken jointly and severally in any and all permutations. Any such moving of the printhead carriage 106 and the build material carriage 103 involves the controller 124 driving respective motors 125, 125' using motor driver circuitry 126. The motor driver circuitry 126 can comprise one or more than one motor driver 128 for controlling at least one of the direction and speed of the respective motors 125, 125'.

Further examples of maintenance operations include, for example, manual cleaning of at least one of the printheads 108 or build material spreader 104. Such maintenance operations may comprise cleaning or replacing the printheads 108 or cleaning or replacing the build material spreader 104. In either case, any such cleaning may involve manually moving the carriage bearing the build material depositor 103 or the printheads 108 into the working area 102 or any other area. It will be appreciated that the electrical environment presented by a 3D printer in a powered state would be hazardous to the maintenance personnel. Therefore, any such maintenance operations can be conducted with the printer 100 being in an unpowered state. However, manual movement of one or both of the carriages 103 and 106 will, in turn, cause manual rotation or manual movement of any motors 125, 125' operable, in response to the controller 124, for ordinarily moving one or both of those carriages 103 and 106 during depositing and printing operations. Even in an unpowered state, manual movement or displacement of those motors 125, 125' will give rise to a back electromotive force (BEMF). The BEMF can be hazardous to maintenance personnel.

Accordingly, examples are provided in which the motor driving circuitry 126 comprises BEMF braking circuitry 130. The BEMF braking circuitry 130 is arranged to use the BEMF to power the motor drivers 128, even though the printer 100 as a whole, or at least in part, is in an unpowered state, to control the motors 125, 125' to urge them in a contrary direction to that giving rise to the BEMF resulting from such manual movement or displacement of at least one, or both, of the build material carriage 103 or the printhead carriage 106. Controlling the motors 125, 125' to urge them in a contrary direction to that giving rise to the BEMF resulting from manual movement of at least one of the build material carriage 103 or the printhead carriage 106 is an example of a braking operation, that is, applying control signals to the motors 125, 125' to at least prevent the carriages 103, 106 being moved more quickly or, alternatively to slow down or stop at least one, or both, of the carriages 103, 106 from moving at all. The motor drivers 128 can be configured to control the motors 125, 125' to brake the motors 125, 125' as a default state.

The BEMF arising from moving the motors 125, 125' is conveyed or carried to the BEMF braking circuitry 130 via one or more than one electrical coupling. In the example illustrated, an electrical coupling 132 is provided between the motor 125, 125' for moving the build material carriage 103 and the BEMF braking circuitry 130. In the example depicted, an electrical coupling 134 is provided between the motor 125, 125' for moving the printhead carriage 106 and the BEMF braking circuitry 130. Examples can be realised in which at least one of, or both of, the electrical couplings 132 and 134 are associated with, or otherwise connected to, a power supply (not shown) for the motor drivers 128 and one or both of the motors 125, 125' associated with at least one, or both, of the build material carriage 103 or the printhead carriage 106.

Examples can be realised in which the default state of the motor drivers 128 is arranged to short-circuit any terminals (not shown) of the motors.

Therefore, using the BEMF generated by the motors 125, 125' in response to manual movement of at least one of the carriages 103 or 106 to power the motor drivers 128 can result in a safer or less harmful electrical environment for maintenance personnel.

Figure 2:
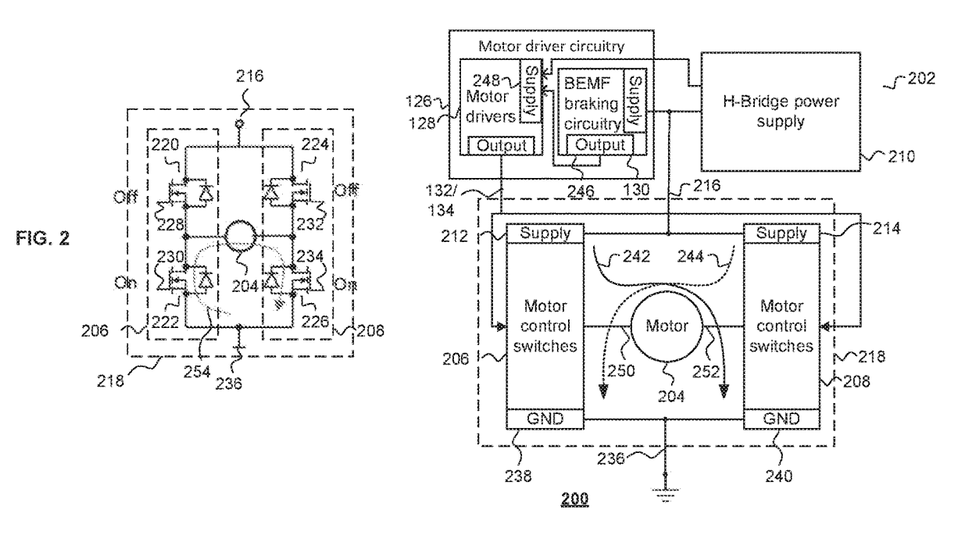
FIG. 2 illustrates motor driver circuitry according to examples.

FIG. 2 shows a view 200 of an example of motor control circuitry 202 for controlling a motor 204. The motor 204 can be an example of one of the above described motors 125, 125' associated with at least one, or both, of the build material carriage 103 or the printhead carriage 106.

The motor driver circuitry 202 comprises a number of motor control switches 206, 208. The motor control switches 206, 208 are operable, under the control of the motor driver circuitry 126, to control the operation of the motor 204. For example, the motor control switches 206, 208 can be selectively arranged to supply power to the motor 204 from a power supply 210 via respective power supply connections 212, 214. The power supply connections 212, 214 are coupled to both the power supply 210 and the motor driver circuitry 126 via one or more than one common power rail 216.

Example implementations can be realised in which the motor control switches 206, 208 are implemented using an H-bridge 218, which is also shown in FIG. 2. It can be appreciated that the H-bridge 218 comprises four switches 220 to 226. In the example shown, the four switches 220 to 226 are realised using N-channel MOSFETs such as, for example, FDD 86540 N-channel MOSFETs available from, for example, Fairchild.

The four switches 220 to 226 are controlled by the motor driver circuitry 126 via respective control inputs 228 to 234. Example implementations can be realised in which the motor driver circuitry 126 supplies respective control signals to the control inputs 228 to 234. For example, the control signals may comprise pulse width modulated (PWM) signals for controlling at least one, or both, of the direction or speed of the motor 204. It will be appreciated that the speed of the motor can be changed by varying the duty cycle of the PWM signals. Additionally, or alternatively, it will be appreciated that the direction of movement or rotation of the motor 204 can be changed, or influenced, by selectively controlling the four switches 220 to 226. Table 1 below shows a truth table, used by the controller 124, for controlling the motor driver circuitry 126 according to desired motor operations:

TABLE 1

| | Switches | | | | Response |
|---|---|---|---|---|---|
| State | 220 | 224 | 222 | 226 | Description/Motor Response |
| | On | Off | Off | On | $1^{st}$ direction/clockwise motor movement |
| | Off | On | On | Off | $2^{nd}$ direction/anti-clockwise motor movement |
| | On | On | Off | Off | Motor brakes and can decelerate |
| | Off | Off | On | On | Motor brakes and can decelerate |

It will be appreciated that the motors 125, 125' may be linear, hence the first and second directions in addition, as alternatives, to clockwise and anti-clockwise rotation.

The motor control switches 206, 208 are coupled to a ground 236 via respective ground connectors 238, 240. In operation, the controller 124 directs the motor drivers 128 to control the switches 220 to 226 according to the above table to effect a desired carriage movement of at least one, or both, of the build material carriage 103 or the printhead carriage 106. Therefore, one current flow 242, via switches 220 and 226, gives rise to motor movement in the $1^{st}$ direction or clockwise direction. Additionally, or alternatively, a further current flow 244, via switches 222 and 224, gives rise to motor movement in the $2^{nd}$ direction or anti-clockwise direction.

Still further, when in an unpowered state, a BEMF generated by motor movement is carried by power rails 216 to the BEMF braking circuitry 130. The BEMF braking circuitry 130 outputs, via an output 246, power to an input 248 of the motor drivers 128 to render them able to output control signals to the switches 220 to 226. The motor movement can arise as a consequence of manual movement of one or more of the carriages 103, 106. It can be appreciated that manual displacement of the carriages 103, 106, or motors, will give rise to the BEMF to brake the motors 125, 125' by using the switches to short-circuit the motor inputs 250, 252, When the BEMF allows switches 222, 226 to be on, a re-circulating or braking current 254 flows through the motors 125, 125' due to the motor inputs 250, 252 being short-circuited. Alternatively, or additionally, the motor inputs 250, 252 can be short-circuited by controlling the upper switches 220, 224. The diodes of the MOSFETS provide a current and voltage path from the motor to the common supply rail 216. Although in the example shown the current and voltage path for the BEMF from the motor to the common supply rail 216 has be realised using diodes, examples can be realised in which such a current and voltage path for the BEMF is implemented in another manner.

Figure 3:
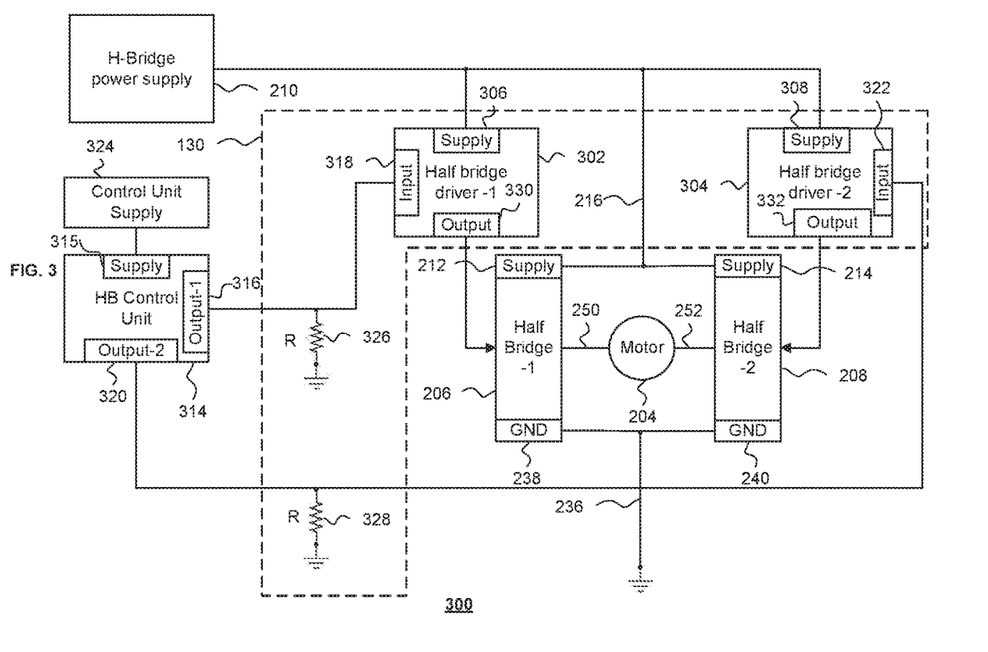
FIG. 3 depicts an example implementation of a motor controller according to some examples.

FIG. 3 shows a view 300 of an example implementation. Reference numerals common to multiple figures relate to the same entity. It can be appreciated that the motor drivers 128 have been implemented as two half bridge drivers 302, 304. The two half bridge drivers 302, 304 are supplied with power, via the common power rail 216, by the H-bridge power supply 210 as described above. Each half bridge driver 302, 304 has a power supply connection 306, 308. Each half bridge driver 302, 304 has one or more than one output 310, 312 for controlling the motor control switches 220 to 226. In the example described, the one or more than one output 310, 312 comprise control signal pathways for controlling the gates of the MOSFETs, that is, the switch control inputs 228 to 234. It can also be appreciated that the motor control switches 206, 208 have been realised in the form of two half bridges comprising switches 220, 222 and switches 224, 226 respectively.

A half bridge control unit 314 can be provided for controlling the half bridge drivers 302, 304. The half bridge control unit 314 comprises one or more than one output for controlling the half bridge drivers 302, 304. In the example depicted, the half bridge control unit 314 comprises an output in the form of a $1^{st}$ interface 316 for controlling a respective half bridge driver 302 via a $1^{st}$ half bridge driver interface 318. Additionally, or alternatively, the half bridge control unit 314 comprises an output in the form of a $2^{nd}$ interface 320 controlling a respective half bridge driver 304 via a $2^{nd}$ half bridge driver interface 322. The half bridge control unit 314 is arranged to control the half bridge drivers 302, 304 according to intended motor movement of the motor 204 as described above with reference to, for example, the truth table shown in table 1. A control unit power supply 324 can be provided for supplying power to the half bridge control unit 314 via control unit power supply connections 315 when the printer 100 is in a powered state.

It will be appreciated that the inputs 318, 322 to the half bridge drivers 302, 304 are tied to a default state. In the example shown, the half bridge drivers 302, 304 are tied to a default state via respective pulldown resistors 326, 328. The default state is such that the half bridge drivers 302, 304 hold the lower switches 222, 226 in the off state. Upon being powered by the BEMF, at least one, or both, of the half bridge control unit 314 or the half bridge drivers 302, 304 are operable, or are operated, to turn on the two lower switches 222, 226 via respective outputs 330, 332. Turning on the two lower switches 222, 226 short-circuits the terminals 250, 252 of the motor 204. Short-circuiting the terminals 250, 252 of the motor 204 results in the braking current 254. The braking current 254 urges movement of the motor 204 in a direction contrary to the manual displacement giving rise to the BEMF. It will be appreciated that such urging has the effect of at least slowing down movement of a respective carriage 103, 106 and, in certain circumstances, can lead to manual displacement of a respective carriage 103, 106 being prevented or terminated. Restricting manual displacement of a respective carriage 103, 106 at least reduces, and can prevent, BEMF from arising, which consequently protects maintenance personnel from injury due to the BEMF.

Figure 4:
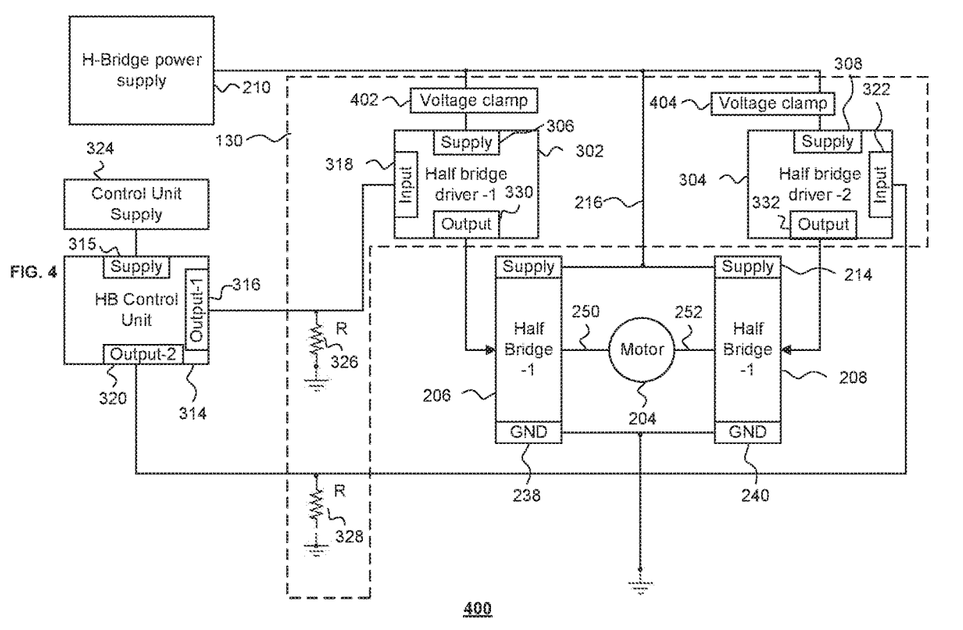
FIG. 4 shows a further implementation of a motor controller according to some examples.

Referring to FIG. 4, there is shown a view 400 of an example implementation. Reference numerals common to FIG. 4 and any other figure refer to the same element and the same operation or functionality. The operation of the example shown in FIG. 4 is identical to that shown in and described with reference to FIG. 3 except where expressly provided otherwise. The example of FIG. 4 comprises at least one voltage clamp for providing a stable, that is, clamped, voltage to the motor drivers. In the example depicted, two such voltage clamps 402, 404 are shown as being disposed between common power rail 216 and the supply connections 306, 308 of the half bridge drivers 302, 304.

In any or all of the above examples, the motor drivers, h-bridge drivers, and half bridge drivers can be realised using, for example, one or more than one L6384e power MOSFET driver available from, for example, STMicroelectronics in which the HVG outputs are coupled to switches 220, 224 and the LVG outputs are coupled to 222, 226.

Figure 5:
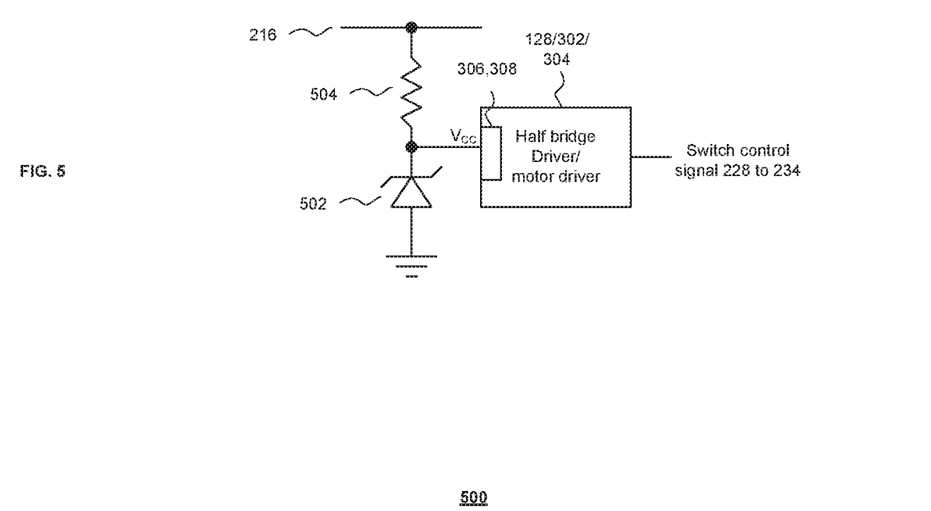
FIG. 5 shows a voltage clamp according to an example.

FIG. 5 shows a view of a voltage clamp 500 according to example implementations. The voltage clamp 500 is an example implementation of the above described voltage clamps 402, 404. The voltage clamp 500 comprises a device 502 for producing a stable voltage from the BEMF produced by manual displacement of the motor. Example implementations use a Zener diode 502 such as, for example, a reverse biased Zener diode to realise a stable voltage. The voltage clamp can also comprise a current limiter 504 for limiting the current through the device 502. In the example implementation the current limiter can be realised using one or more than one resistor such as the resistor 504 shown. It can be seen that the device 502 provides the stable voltage as a power supply source to power supply connections 306, 308 of the drivers 128, 302, 304.

Although the implementations have been described with reference to a 3D printer, example implementations are not limited to 3D printers. Example implementations can comprise other device such as, for example, 2D printers, scanners, photocopiers or the like, in which a motor can be actuated by manual carriage displacement or otherwise. It will be appreciated that 3D printers, 2D printer, scanners, copiers and the like are examples of a device.

Implementations can be realised according to one or more of the following examples.

Example 1 provides a back electromotive force controller for influencing movement of a carriage of a device, such as, for example, a printer or scanner in an unpowered state; the carriage being moveable by a motor responsive to a motor driver; the controller comprising: braking circuitry to couple power associated with a back electromotive force generated by manual displacement of the motor, due to carriage movement, to power the motor driver to urge the motor in a contrary direction to the displacement. It will be appreciated that the above described BEMF braking circuitry 130 can be, or can be part of, an example implementation of such braking circuitry.

Example 2 provides the controller of example 1, in which the braking circuitry comprises a voltage clamp to provide a stable voltage to the motor driver.

Example 3 provides the controller of example 2, in which the voltage clamp comprises a reverse biased Zener diode.

Example 4 provides the controller of example 3, further comprising a current limiter associated with the Zener diode to control current through the Zener diode.

Example 5 provides the controller of example 4, in which the current limiter comprises a resistor in series with the Zener diode to limit the current through the Zener diode.

Example 6 provides the controller of any of examples 2 to 6, in which the stable voltage is derived from a voltage associated with at least the reverse biased Zener diode.

Example 7 provides the controller of any preceding example, in which the braking circuitry comprises motor circuitry to short-circuit electrical terminals of the motor.

Example 8 provides the controller of example 7, in which the motor circuitry comprises an H-bridge.

Example 9 provides the controller of any of examples 1 to 7, in which an input of the motor driver is tied to a state associated with short-circuiting electrical terminals of the motor.

Example 10 provides the controller of any of examples 1 to 8, comprising an h-bridge to control current flow associated with the motor wherein the braking circuitry comprises at least one semiconductor device of the h-bridge to provide an electrical coupling between at least one electrical terminal of the motor and the motor driver.

Example 11 provides the controller of example 10, in which the semiconductor device is at least one of FET or a diode of the FET.

Example 12 provides the controller of example 11, in which the at least one of a FET or diode of a FET is arranged to couple the back electromotive force to a power supply for the motor.

Example 13 provides the controller of any of examples 1 to 12, in which the motor and the motor driver share common power rails.

Example 14 provides circuitry for controlling the motion of a carriage of a device, such as, for example, a printer, scanner, copier or the like, the circuitry comprising: a motor driver to drive a motor to control movement of the carriage; and braking circuitry responsive to movement of the motor due to a manual displacement of the carriage to power the motor driver to drive the motor to oppose the manual displacement of the carriage using a back electromotive force generated by the movement of the motor.

Example 15 provides a device such as, for example, a printer, scanner, copier, or the like, comprising the controller or circuitry of any preceding example.

Throughout the description and claims of this application, the words "comprise" and "contain" and variations of them mean "including but not limited to", and they are not intended to (and do not) exclude other moieties, additives, components, integers or stages. Throughout the description and claims of this application, the singular encompasses the plural unless the context indicates otherwise. In particular, where the indefinite article is used, the specification is to be understood as contemplating the plural as well as the singular, unless the context indicates otherwise.

The invention claimed is:

1. A back electromotive force controller for influencing movement of a carriage of a device in an unpowered state; the carriage being moveable by a motor responsive to a motor driver; the controller comprising: braking circuitry to couple power associated with a back electromotive force generated by manual displacement of the motor, due to carriage movement, to power the motor driver to urge the motor in a contrary direction to the displacement.

2. The controller of claim 1, in which the braking circuitry comprises a voltage clamp to provide a stable voltage to the motor driver.

3. The controller of claim 2, in which the voltage clamp comprises a reverse biased Zener diode.

4. The controller of claim 3, further comprising a current limiter associated with the Zener diode to control current through the Zener diode.

5. The controller of claim 4, in which the current limiter comprises a resistor in series with the Zener diode to limit the current through the Zener diode.

6. The controller of claim 2, in which the stable voltage is derived from a voltage associated with at least the reverse biased Zener diode.

7. The controller of claim 1, in which the braking circuitry comprises motor circuitry to short-circuit electrical terminals of the motor.

8. The controller of claim 7, in which the motor circuitry comprises an H-bridge.

9. The controller of claim 1, in which an input of the motor driver is tied to a state associated with short-circuiting electrical terminals of the motor.

10. The controller of claim 1, comprising an h-bridge to control current flow associated with the motor wherein the braking circuitry comprises at least one semiconductor device of the h-bridge to provide an electrical coupling between at least one electrical terminal of the motor and the motor driver.

11. The controller of claim 10, in which the semiconductor device is at least one of FET or a diode of the FET.

12. The controller of claim 11, in which said at least one of a FET or diode of a FET is arranged to couple the back electromotive force to a power supply for the motor.

13. The controller of claim 1, in which the motor and the motor driver share common power rails.

14. Circuitry for controlling the motion of a carriage of a device, the circuitry comprising: a motor driver to drive a motor to control movement of the carriage; and braking circuitry responsive to movement of the motor due to a manual displacement of the carriage to power the motor driver to drive the motor to oppose the manual displacement of the carriage using a back electromotive force generated by the movement of the motor.

15. A device comprising a back electromotive force controller for influencing movement of a carriage of a device in an unpowered state; the carriage being moveable by a motor responsive to a motor driver; the controller comprising: braking circuitry to couple power associated with a back electromotive force generated by manual displacement of the motor, due to carriage movement, to power the motor driver to urge the motor in a contrary direction to the displacement.

* * * * *